(12) United States Patent
Shouno

(10) Patent No.: US 8,402,286 B2
(45) Date of Patent: Mar. 19, 2013

(54) INFORMATION PROCESSING APPARATUS, CONTROL METHOD THEREFOR, AND STORAGE MEDIUM

(75) Inventor: Hiroki Shouno, Kawasaki (JP)

(73) Assignee: Canon Kabushiki Kaisha (JP)

( * ) Notice: Subject to any disclaimer, the term of this patent is extended or adjusted under 35 U.S.C. 154(b) by 588 days.

(21) Appl. No.: 12/434,731

(22) Filed: May 4, 2009

(65) Prior Publication Data

US 2009/0287941 A1 Nov. 19, 2009

(30) Foreign Application Priority Data

May 15, 2008 (JP) .................................. 2008-128314

(51) Int. Cl.
*H04L 29/06* (2006.01)
(52) U.S. Cl. ......................................................... 713/193
(58) Field of Classification Search .................... 713/193
See application file for complete search history.

(56) References Cited

U.S. PATENT DOCUMENTS 7,975,147 B1 * 7/2011 Qumei .......................... 713/193

2003/0187999 A1 * 10/2003 Callum ......................... 709/229
2004/0128553 A1 * 7/2004 Buer et al. .................... 713/201
2004/0175000 A1 * 9/2004 Caronni ........................ 380/285

FOREIGN PATENT DOCUMENTS

JP 2006-210995 A 8/2006
JP 2006-277518 A 10/2006

OTHER PUBLICATIONS

Japanese Office Action issued in counterpart application No. JP2008-128314, dated Jun. 5, 2012.

* cited by examiner

Primary Examiner — Michael S McNally
(74) Attorney, Agent, or Firm — Rossi, Kimms & McDowell LLP

(57) ABSTRACT

An information processing apparatus which makes it possible to store encrypted data of packets in a decrypted state, and improve the efficiency of data analysis. A network interface receives encrypted data which has been encrypted, and data which has not been encrypted, from a network. A HDD stores received data. A IPSec module is operable when an item of the received is an item of the encrypted data, to decrypt the item of the encrypted data. A packet acquisition sub application searches the data stored in HDD for an item of the encrypted data corresponding to an decrypted item of data. The packet acquisition sub application updates the item of the received encrypted data based on the decrypted item of the data.

14 Claims, 12 Drawing Sheets

FIG.7

```
701 ── Hush:1048FB625AA901CE8
702 ── Time:200706280921480001
703 ┌ DLC: ----- DLC Header -----
     │     DLC: Frame 66 arrived at 15:26:29.3106; frame size is 186 (00BA hex) bytes.
     │     DLC: Destination = Station 00065B871109, Dell-NewPC(Global)
     │     DLC: Source      = Staion 00062A26A7FC
     └     DLC: Ethertype   = 0800 (IP)
704 ┌ IP: ----- IP Header -----
     │     IP: Version = 4. header length = 20bytes
     │     IP: Type of service = 00
     │     IP:      000. ...   = routine
     │     IP:      ...0 ....  = normal delay
     │     IP:      .... 0...  = normal throughput
     │     IP:      .... .0..  = normal reliability
     │     IP:      .... ..0.  = ECT bit - transport protocol will ignore the CE bit
     │     IP:      .... ...0  = CE bit - no congestion
     │     IP: Total length    = 172 bytes
     │     IP: Identification  = 12885
     │     IP: Flags           = 4X
     │     IP:      .1.. ....  = don't fragment
     │     IP:      ..0. ....  = last fragment
     │     IP: Fragment offset = 0 bytes
     │     IP: Time to live    = 251 seconds/hops
     │     IP: Protocol        = 6 (TCP)
     │     IP: Header checksum = 937D (correct)
     │     IP: Source address      = [150.61.8.125]
     │     IP: Destination address = [172.24.110.166]
     └     IP: No options
705 ┌ ESP: ----- ESP Data -----
     │     SP1         = 0x70401111
     │     Sequence    = 1
     │     data        = 03 46 a8 18 44 52 cf c1 2e 09 8a 97 65 85 ff ec
     │     data        = 2e 09 8a 97 65 85 ff ec 2e 09 8a 2e 09 8a 97 c1
     └     data        = 03 46 a8 18 44 52 cf c1 18 44 52 cf c1 2e 09
```

FIG.8

| | 801 | 802 | 803 | 804 | 805 | 806 |
|---|---|---|---|---|---|---|
| | From IP | To IP | FROM PORT | TO PORT | PROTOCOL | ENCRYPTION |
| | 172.24.0.1 | 172.24.100.99 | Any | 9100 | TCP | 3DES |
| | ANY | 172.24.1.1 | Any | Any | TCP | AES |
| | 172.24.0.1 | 172.24.100.98 | Any | 161 | UDP | AES |

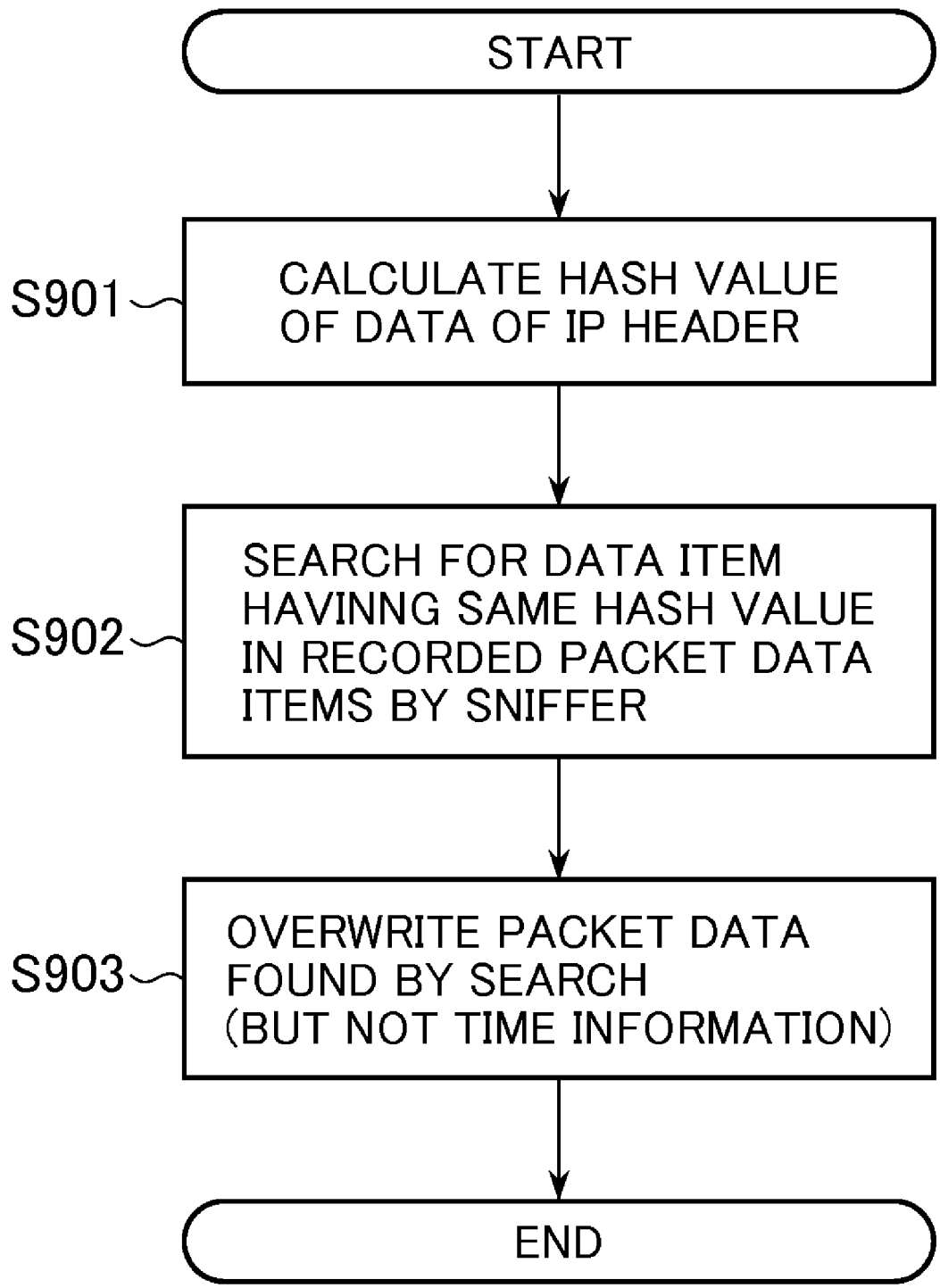

FIG.10

```
Hush: 1048FB625AA901CE8
Time : 200706280921480001
DLC: ----- DLC Header -----
        DLC: Frame 66 arrived at 15:26:29.3106; frame size is 186 (00BA hex) bytes.
        DLC: Destination = Station 00065B871109, Dell-NewPC(Global)
        DLC: Source      = Staion 00062A26A7FC
        DLC: Ethertype   = 0800 (IP)
IP: ----- IP Header -----
        IP: Version = 4. header length = 20bytes
        IP: Type of service = 00
            IP:      000. ...    = routine
            IP:      ...0 ....   = normal delay
            IP:      .... 0...   = normal throughput
            IP:      .... .0..   = normal reliability
            IP:      .... ..0.   = ECT bit - transport protocol will ignore the CE bit
            IP:      .... ...0   = CE bit - no congestion
        IP: Total length   = 172 bytes
        IP: Identification =12885
        IP: Flags          = 4X
            IP:      .1.. ....   = don't fragment
            IP:      ..0. ....   = last fragment
        IP: Fragment offset = 0 bytes
        IP: Time to live    = 251 seconds/hops
        IP: Protocol        = 6 (TCP)
        IP: Header checksum = 937D (correct)
        IP: Source address      = [150.61.8.125]
        IP: Destination address = [172.24.110.166]
        IP: No options
TCP: ----- TCP header -----
        TCP: Source port             = 80 (WWW-HTTP)
        TCP: Destination port        = 2832
        TCP: Sequence number         = 1787721886
        TCP: Next expected Seq number = 1787722018
        TCP: Acknowledgment number   = 1695163690
        TCP: Data offset             = 20 bytes
        TCP: Flags                   = 18
        TCP:                    ..0. ....  = (No urgent pointer)
```

1001

INFORMATION PROCESSING APPARATUS, CONTROL METHOD THEREFOR, AND STORAGE MEDIUM

BACKGROUND OF THE INVENTION

1. Field of the Invention

The present invention relates to an information processing apparatus which carries out processing concerning packet data including encrypted data, a control method therefor, and a storage medium.

2. Description of the Related Art

Conventionally, there has been proposed a technique in which when a network communication device connected to a communication channel of a network has a trouble, the cause of the trouble is investigated by sampling packets flowing through the channel. In this technique, a method is generally employed in which a dedicated device for acquiring packets is connected to a line concentrator, such as a HUB or the like, and packets flowing through a LAN (Local Area Network) are sampled using the dedicated device.

Data of packets transmitted and received by the network communication device under investigation are extracted from the sampled packets, and contents of the data of packets are analyzed to locate a point where data which does not meet the specified requirements is received or a point where response delay to reception of packets occurs. Then, to determine whether or not the located point is the cause of the trouble, investigation of the cause is performed, e.g. by transmitting the same packet to the network communication device to check if the trouble is reproduced, or by analyzing a source cord which is responsible for communication of the network communication device.

In recent years, network communication devices provided with a function of acquiring packets are coming into wide use. This makes it possible to acquire packets without using dedicated devices for extracting packets. Conventionally, in an environment where a switching HUB is introduced, it is impossible to properly perform sampling of packets even by connecting a dedicated device to the switching HUB.

This is because the switching HUB refers to information of a destination address in each network frame, and transfers packets (frames) only to a HUB port thereof to which a node having the address is connected, and hence even if a packet-acquiring device is connected to another HUB port, it is impossible to acquire packets. In a network communication device provided with the function of acquiring packets, it is possible to acquire packets at the node which is performing the packet communication, and hence it becomes possible to acquire packets even under such a switching HUB environment.

Further, in recent years, IPSec (IP Security) is becoming popular which is a technique for encrypting a communication channel of an IP (Internet Protocol) as a network layer protocol used on the Internet. IPSec is a name collectively referring to techniques for authentication, encryption, key exchange, etc. which provides a standard of protocols, a header structure, and so forth. In general, IPSec encrypts packets such that data in higher layers than the IP layer is encrypted.

IPSec has an advantageous feature that protocols in the higher layers than the IP layer need not be aware of IPSec. That is, TCP (Transport Control Protocol), UDP (User Datagram Protocol), ICMP (Internet Control Message Protocol), and like other protocols are capable of operating without being aware of whether or not IPSec is operating.

Further, specifications of IPSec are defined in both of IPv4 (Internet Protocol Version 4) and an IPv6 (Internet Protocol Version 6). In using IPSec, a definition of what type of process should be performed on what type of packets is referred to as a security policy therefor. This security policy is a rule which defines packets to which IPSec is to be applied, in respect of addresses, higher protocols, and ports, and defines an authentication method and an encryption method applied to them.

A collection of security policies is referred to as a security policy database (SPD). An IPSec execution module can determine what type of IPSec process should be carried out on what type of packets by referring to the SPD. Since packets are encrypted in such an environment in which IPSec operates, the communication channel through which the packets flow becomes secure. Therefore, even if a third party attempts to tap packets on the network, the confidentiality of data is protected thanks to the encryption of packets.

To analyze such encrypted packets, it is a generally employed method that a packet acquirer is provided with information necessary for encryption and decryption of packets in advance, and performs decryption on the acquired encrypted packets based on the information.

Examples of the above-mentioned method include a technique proposed in Japanese Laid-Open Patent Publication No. 2006-277518. According to the technique proposed in this publication, KVM-related packets flowing through a network are sampled, and if the packets are encrypted, the packets are decrypted based on information acquired in advance to record data of the decrypted packets. This makes it possible to maintain the communication channel in the secure encrypted state, and capture decrypted data.

However, in the capturing of packets performed under an environment where the above-mentioned IPSec is introduced, there is a problem which is encountered in a case where all data of the network frames are desired to be captured. When the network communication device having a function of acquiring packets performs communication by IPSec, packets received by the network communication device are in a state in which data thereof in the higher layers than the IP layer is encrypted by IPSec. The encrypted part of the packets is decrypted by the IPSec module which operates within the IP stack.

On the other hand, in a general packet-capturing method, data of received packets is captured at a network card driver level. By acquiring data of the received packet from the network card driver, it is possible to acquire data of the received packets from the data link layer thereof without leaving out any data. Therefore, as for the packet acquiring function which is required to acquire all data of the received packets, it is necessary to acquire data at the network card driver level.

However, the network card driver is placed at a lower level than the IP stack, and hence the data acquired from the network card driver is in a state encrypted by IPSec. That is, even if received packets are acquired, data of the receive packets in the layers higher than the IP layer is encrypted, and hence it is impossible to obtain information useful for analysis of the packets. This is a problem that is not encountered in a case where data desired to be acquired for analysis belongs to layers higher than the IP layer, such as KVM-related packets, as proposed in the technique described in Japanese Laid-Open Patent Publication No. 2006-277518. This is because if an object to be analyzed is data in higher layers than the IP layer, it is only necessary to acquire raw data which is obtained by decrypting the encrypted data by IPSec.

However, in the case of acquisition of packets which is carried out for the purpose of analysis of a trouble in a network communication device, it is demanded to acquire all network frame data, and hence it is necessary to acquire data before decryption at the network card driver level, which brings about a problem that the acquired data is in an encrypted state. Therefore, the conventional technique has a problem in data analysis.

SUMMARY OF THE INVENTION

The present invention provides an information processing apparatus which makes it possible to store encrypted data of packets in a decrypted state, and improve the efficiency of data analysis, a control method therefor, and a storage medium.

In a first aspect of the present invention, there is provided an information processing apparatus comprising a reception unit configured to receive encrypted data which has been encrypted, and data which has not been encrypted, from a network, a storage unit configured to store data received by the reception unit, a decryption unit configured to be operable when an item of the data received by the reception unit is an item of the encrypted data, to decrypt the item of the encrypted data, a search unit configured to search the data stored in the storage unit for an item of the encrypted data corresponding to an item of data decrypted by the decryption unit, and an update unit configured to update the item of the encrypted data which has been found by the search unit based on the item of the data decrypted by the decryption unit.

In a second aspect of the present invention, there is provided a method of controlling an information processing apparatus, comprising receiving encrypted data which has been encrypted, and data which has not been encrypted, from a network, storing data received by the receiving, decrypting an item of the encrypted data when an item of the data received by the receiving is an item of the encrypted data; searching the data stored by the storing for an item of the encrypted data corresponding to an item of data decrypted by decrypting, and updating the item of the encrypted data which has been found by the searching based on the item of the data decrypted by the decrypting.

In a third aspect of the present invention, there is provided a computer-readable storage medium storing a computer-executable program for causing a computer to execute a method of controlling an information processing apparatus, wherein the method comprises receiving encrypted data which has been encrypted, and data which has not been encrypted, from a network, storing data received by the receiving, decrypting an item of the encrypted data when an item of the data received by the receiving is an item of the encrypted data, searching the data stored by the storing for an item of the encrypted data corresponding to an item of data decrypted by decrypting, and updating the item of the encrypted data which has been found by the searching based on the item of the data decrypted by the decrypting.

According to the present invention, a search for encrypted data corresponding to decrypted data is performed on stored data, and the encrypted data found by the search is updated based on the decrypted data. This makes it possible to store the data of packets which are encrypted by an encryption technique for encrypting a communication channel of a communication protocol used in a network communication, in a decrypted state, to thereby make it possible to improve the efficiency of data analysis.

The features and advantages of the invention will become more apparent from the following detailed description taken in conjunction with the accompanying drawings.

BRIEF DESCRIPTION OF THE DRAWINGS

FIG. 7 is a diagram showing a structure of an encrypted packet.

FIG. 8 is a diagram showing a structure of an SPD.

FIG. 9 is a flowchart of a process executed by a packet acquisition sub application of the MFP.

FIG. 10 is a diagram showing a structure of a decrypted packet.

DETAILED DESCRIPTION OF THE EMBODIMENTS

The present invention will now be described in detail below with reference to the accompanying drawings showing embodiments thereof.

Figure 1:
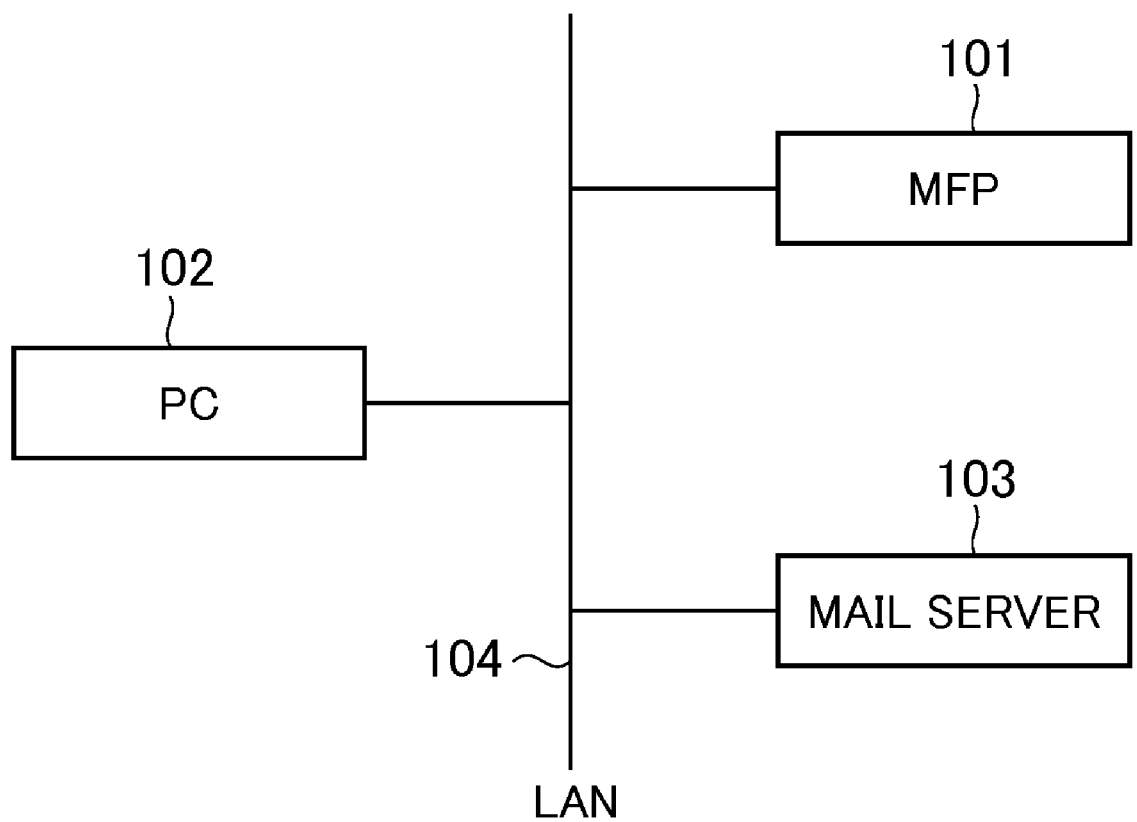
FIG. 1 is a diagram showing an example of the configuration of a network system including an MFP as an information processing apparatus according to a first embodiment of the present invention.

FIG. 1 is a diagram showing an example of the configuration of a network system including an MFP as an information processing apparatus according to a first embodiment of the present invention.

As shown in FIG. 1, the network system is comprised of an MFP (Multi-Function Peripheral) 101, a personal computer (hereinafter referred to as the "PC") 102, and a mail server 103. In the present embodiment, a description will be given of a configuration and control for realizing a process in which the PC 102 transmits IPSec packets forming a print job having IPSec applied thereto to the MFP 101, and the MFP 101 stores received IPSec packets as packet data. IPSec (IP Security) is a protocol suite related to a technique for additionally providing a security function for encrypting an IP communication channel.

Let it be assumed that a LAN 104 is a network in a user environment, and is configured as an Ethernet (registered trademark) network. The MFP 101, the PC 102, and the mail server 103 as nodes each having a network interface are connected to the LAN 104. These nodes are capable of communicating with each other based on TCP/IP (Transmission Control Protocol/Internet Protocol).

The MFP 101 is a multi-function peripheral which is equipped with a copy function for printing out an image obtained by reading an original, a print function for printing out an image, and a network communication function. The MFP 101 receives IPSec packets which form a print job having IPSec applied thereto and are transmitted from the PC 102, and carries out a printing process. The hardware configuration of the MFP 101 will be described in detail hereinafter with reference to FIG. 2.

The PC 102 is a general PC, and is comprised of a CPU, a RAM, a ROM, and an HDD, as hardware component elements, none of which are shown. Further, the PC 102 is comprised of a CD-ROM drive, an NIC (Network Interface Card), a USS (Universal Serial Bus), a host interface, and a bus, none of which are shown. The CPU is a central processing unit for controlling the sections of the PC. The RAM, the ROM, and the HDD are storage devices. The CD-ROM drive is an external storage device. The NIC and the USB are external interfaces. The bus is a transmission path for controlling these component elements and peripheral devices. Peripheral devices, such as a mouse, a display, and a keyboard, none of which are shown, are connected to the PC 102.

Major software installed in the PC 102 includes an OS (Operating System), and office software, such as word-processing software and spreadsheet software. The OS is provided with a port monitor, as a function thereof, for use in transmitting print data to the MFP 101 or a printer (not shown) via the LAN 104. Further, a mailer which performs transmission and reception of e-mails to and from the mail server 103 is also installed. Further, the OS integrates an IPSec module for encrypting these communications by IPSec.

The mail server 103 controls transmission and reception of e-mails using an SMTP (Simple Mail Transfer Protocol) or a POP3 (Post Office Protocol 3). E-mail accounts which enable respective nodes (MFP 101 and PC 102) to transmit e-mails via the mail server 103 are set in the mail server 103. Further, the mail server 103 has an IPSec module (see FIG. 3) installed in the OS thereof, for encrypting transmitted and received packets by IPSec. This makes it possible to perform communications between the mail server 103, and the MFP 101 and the PC 102, by IPSec.

Figure 2:
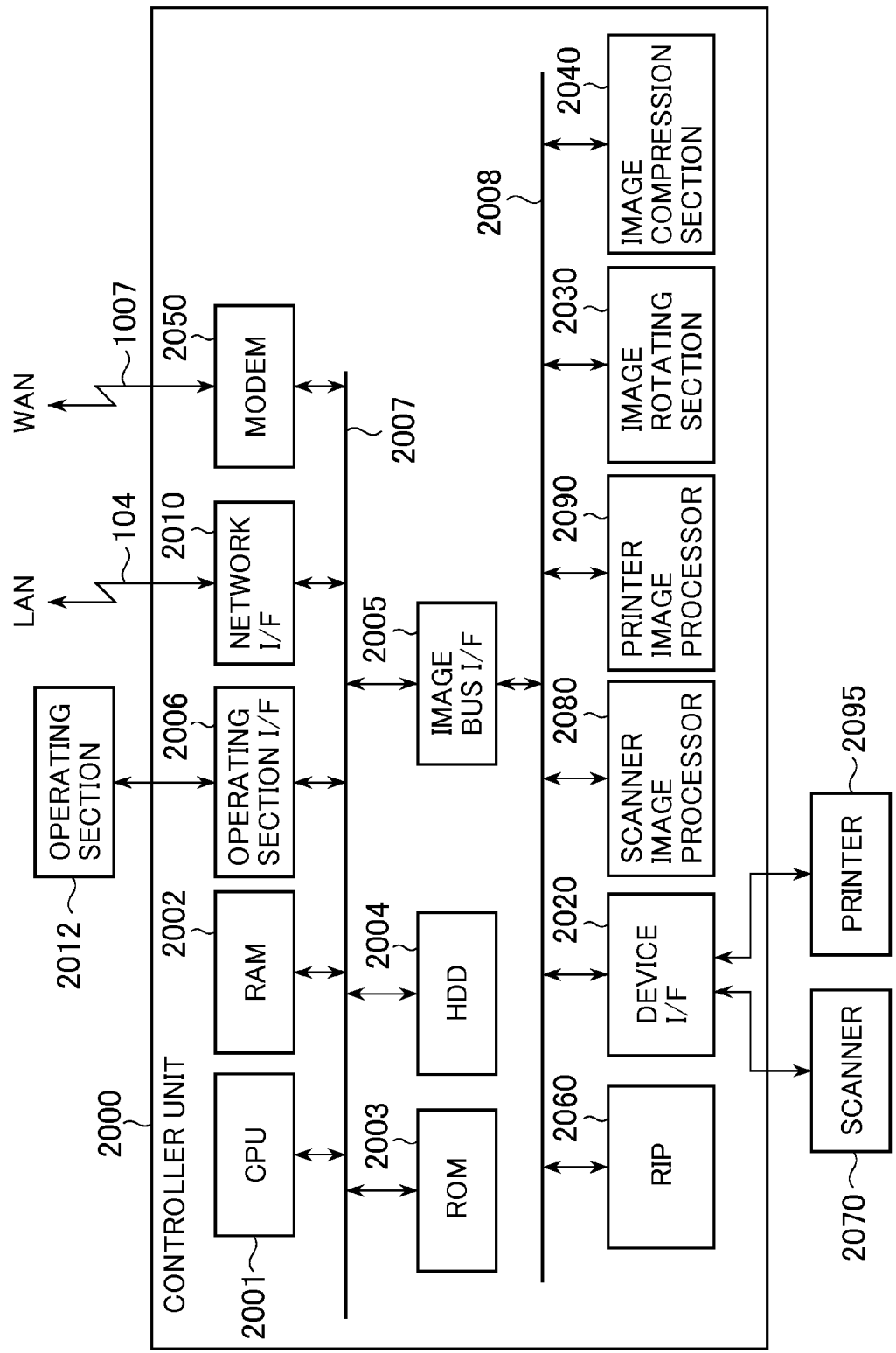
FIG. 2 is a block diagram showing essential parts of a controller unit of the MFP appearing in FIG. 1.

FIG. 2 is a block diagram showing essential parts of a controller unit 2000 of the MFP 101 as the information processing apparatus according to the first embodiment.

As shown in FIG. 2, the controller unit 2000 is comprised of a CPU 2001, a RAM 2002, a ROM 2003, an HDD 2004, an operating section interface (hereinafter referred to as the "I/F") 2006, a network I/F 2010, a modem 2050. The controller unit 2000 is further comprised of a device I/F 2020, an image rotating section 2030, an image compression section 2040, a raster image processor 2060, a scanner image processor 2080, and a printer image processor 2090.

The controller unit 2000 performs control for realizing a copy function for printing out image data read from an original by a scanner 2070 as an image input device, using a printer 2095 as an image output device. Further, the controller unit 2000 performs control for inputting and outputting image information and device information by the LAN 104 to which the MFP 101 is connected.

The CPU 2001 starts the operation system (OS) by a boot program stored in the ROM 2003. The CPU 2001 carries out various processes by executing the application programs stored in the HDD 2004, on the OS. Further, the CPU 2001 carries out processes described hereinafter with reference to flowcharts thereof. The RAM 2002 provides a work area of the CPU 2001 and an image memory area for temporarily storing image data. The HDD 2004 stores the above-mentioned application programs and image data.

The operating section I/F 2006 controls an interface to an operating section 2012 equipped with a touch panel, and outputs image data to be displayed to the operating section 2012 for display thereon. Further, the operating section I/F 2006 transmits information input from the operating section 2012 by a user to the CPU 2001. The network I/F 2010 inputs and outputs information to and from each apparatus on the LAN 104 via the LAN 104. The modem 2050 inputs and outputs information via a WAN 1007.

An image bus I/F 2005 is a bus bridge that connects a system bus 2007 and an image bus 2008 which transfers image data at high-speed to each other and carries out conversion of data structures. The image bus 2008 is comprised of a PCI (Peripheral Component Interconnect) bus or an IEEE 1394 bus. The raster image processor (hereinafter referred to as the "RIP") 2060 rasterizes a PDL code into a bitmap image. The scanner 2070 and the printer 2095 are connected to the device I/F 2020. The device I/F 2020 performs conversion between synchronous image data and asynchronous image data.

The scanner image processor 2080 corrects, processes, and edits input image data. The printer image processor 2090 performs correction and resolution conversion on image data for printout. The image rotating section 2030 rotates image data. The image compression section 2040 compresses multivalued image data into JPEG (Joint Photographic Experts Group) data, and compresses binary image data into data such as JBIG (Joint Bi-level Image Experts Group), MMR (Modified Modified READ), and MH (Modified Huffman), and carries out expansion processing on these data.

Figure 3:
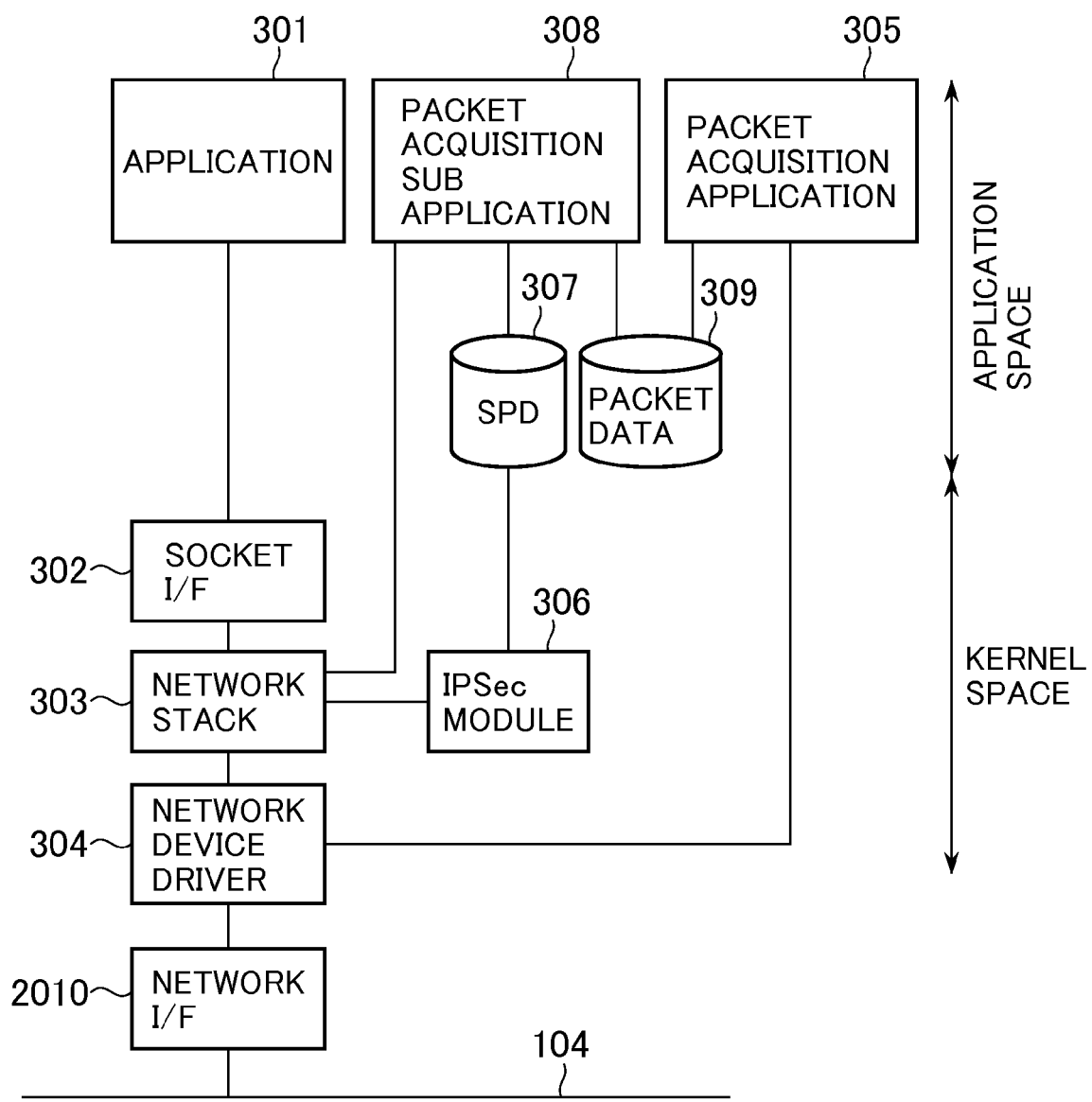
FIG. 3 is a block diagram of a network packet processing system of the MFP.

FIG. 3 is a block diagram of a network packet processing system of the MFP 101. The configuration of the network packet processing system shown in FIG. 3 is an example for realizing a reception unit, a storage unit, a decryption unit, a search unit, an update unit, and a unit configured to calculate a hash value, of the present invention.

FIG. 3 shows the software configuration of essential parts of the present embodiment. The MFP 101 is equipped with a general-purpose OS (Operation System) such as Linux. That is, the MFP 101 includes an application program (hereinafter simply referred to as the "application") 301, a socket I/F 302, a network stack 303, and a network device driver 304. The MFP 101 further includes a packet acquisition application 305, an IPSec module 306, an SPD 307, a packet acquisition sub application 308, and packet data 309.

The application 301 is a collection of network applications which operate on the MFP 101. The network applications included in the application 301 will be described in detail hereinafter with reference to FIG. 4. The socket I/F 302 is a socket I/F program provided by the OS. When a network application included in the application 301 performs communication, it becomes possible to carry out processing of transmission and reception of data by calling the socket I/F 302.

Although the socket I/F 302 is not a program which is necessarily required when the network application performs communication, it can use general program instructions and processing flows irrespective of the type of the OS, and hence the number of man-hours for development of applications can be reduced. For this reason, network applications generally call the socket I/F 302 so as to perform data transmission and reception. The network stack 303 is a group of protocol stacks. The network device driver 304 is a network device driver of the network I/F 2010.

The packet acquisition application 305 acquires packets which the network I/F 2010 transmits and receives via the network, and records data of the acquired packets as packet data 309 in a predetermined area of the HDD 2004. The packet acquisition application 305 acquires data from the network device driver 304, thereby acquiring all packets received by the network I/F 2010 and all packets transmitted by the network I/F 2010.

The IPSec module 306 performs IPSec processing (processing such as encryption and decryption) on transmitted packets and received packets, and operates as a part of kernel (core function of the OS). The IPSec module 306 implements IPSec in the protocols of the IPv4 and the IPv6. The SPD 307 is a database used by the IPSec module 306, and is comprised of a collection of security policies for defining what types of authentication method and encryption method be applied to packets to which IPSec is applied.

The packet acquisition sub application 308 is a program for acquiring data in higher layers than the IPSec layer. The packet acquisition sub application 308 writes the acquired data as the packet data 309 in the predetermined area of the HDD 2004. Further, the packet acquisition sub application 308 determines whether or not packet data in the IP layer is IPSec packet data by comparison between the contents of the packet data in the IP layer and the settings of security polices stored in the SPD 307. The packet data 309 is a group of files of packet data items which are acquired by the packet acquisition application 305 and the packet acquisition sub application 308, and are stored in the predetermined area of the HDD 2004.

The application 301, the packet acquisition application 305, and the packet acquisition sub application 308 operate in an application space. The socket I/F 302, the network stack 303, the network device driver 304, and the IPSec module 306 operate in a kernel space.

Figure 4:
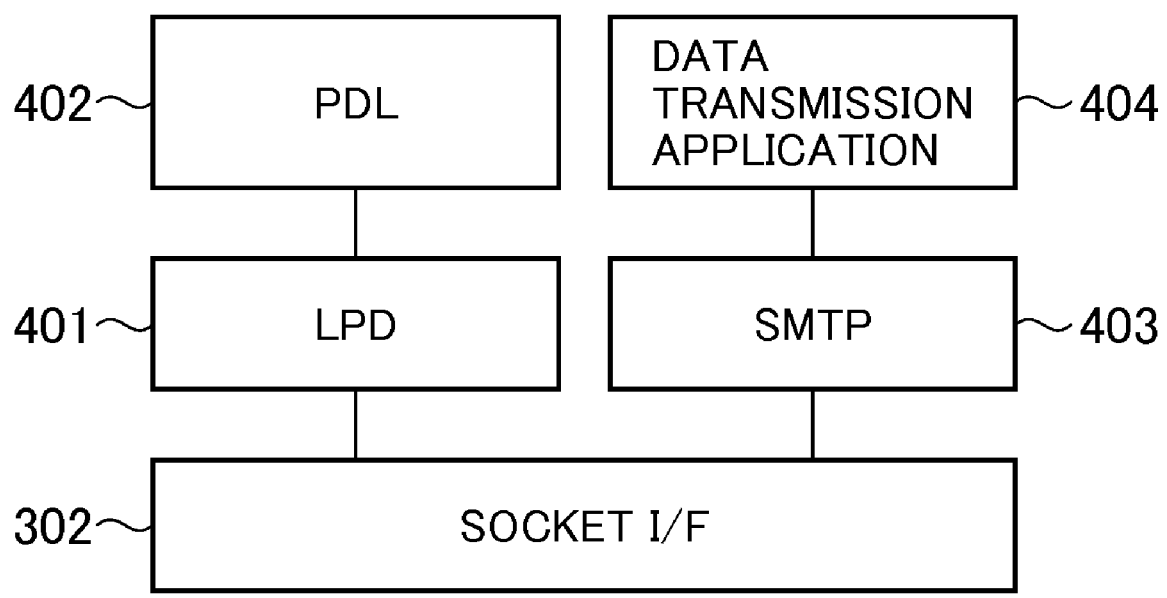
FIG. 4 is a block diagram showing a configuration of network applications included in applications of the MFP.

FIG. 4 is a block diagram showing a configuration of network applications included in the application 301 of the MFP 101.

As shown in FIG. 4, the application 301 of the MFP 101 includes an LPD 401, a PDL 402, a SMTP 403, and a data transmission application 404. The LPD 401 is a server program for receiving a print job using LPD (Line Printer Daemon protocol) via the network. When the PC 102 transmits a print job to the MFP 101, using LPR (Line Printer Remote Protocol), the LPD 401 receives data of the print job. The data of the print job received by the LPD 401 is transferred to the PDL 402.

The PDL 402 is a program for converting a print job into data of printed pages. The data of the print job is described in a description language referred to as PDL (Page Description Language). The description language is comprised of not only print job data but also information added thereto which is required for printing. The added information includes the size of a sheet for printing, the number of copies, etc. by way of example. The PDL 402 converts the print job data described in PDL to a video image, and creates video data according to specified printing attributes. The created video data is transferred to the printer 2095 for printout.

The data transmission application 404 provides a function of transmitting image data scanned from an original by the scanner 2070 to the mail server 103 via the LAN 104. The scanned image is formed into a file in an image format, e.g. JPEG or PDF (Portable Document Format). The data transmission application 404 transfers the file to the mail server 103 via the SMTP 403. The SMTP 403 is a network application for transmitting e-mails to the mail server 103 using an SMTP protocol. In the present embodiment, it is assumed that the setting that e-mails are transmitted to the mail server 103 has been made in advance.

The present embodiment is characterized by the following features:

The IPSec module 306 applies IPSec to network communications. The packet acquisition application 305 acquires packets in the data link layer and stores the acquired packets as the packet data 309. Further, the packet acquisition application 305 acquires packet data in the IP layer in a state not having IPSec applied thereto by the IPSec module 306.

When the packet data in the IP layer is packet data having IPSec applied thereto (herein referred to as "IPSec packet"), the packet acquisition sub application 308 updates the packet data stored in the packet data 309 based on the packet data of which an encrypted portion is decrypted. That is, the encrypted portion of the packet data stored as a portion of the packet data 309 is overwritten with the corresponding decrypted portion of the packet data.

Further, a hash value is calculated based on the received data. A hash value is also calculated based on the decrypted data. Then, a stored and received packet data item is searched for by comparing the calculated hash values. Further, in the encrypted data, data in the higher layers than the network layer is encrypted, but data added in the network layer and the lower layers than the network layer (specific data associated therewith) is not encrypted. The hash value is calculated based on the data in the network layer and the lower layers than the network layer.

Next, a description will be given of operation of the MFP 101 of the network system having the above-described configuration according to the present embodiment with reference to FIGS. 5 to 10.

Figure 5:
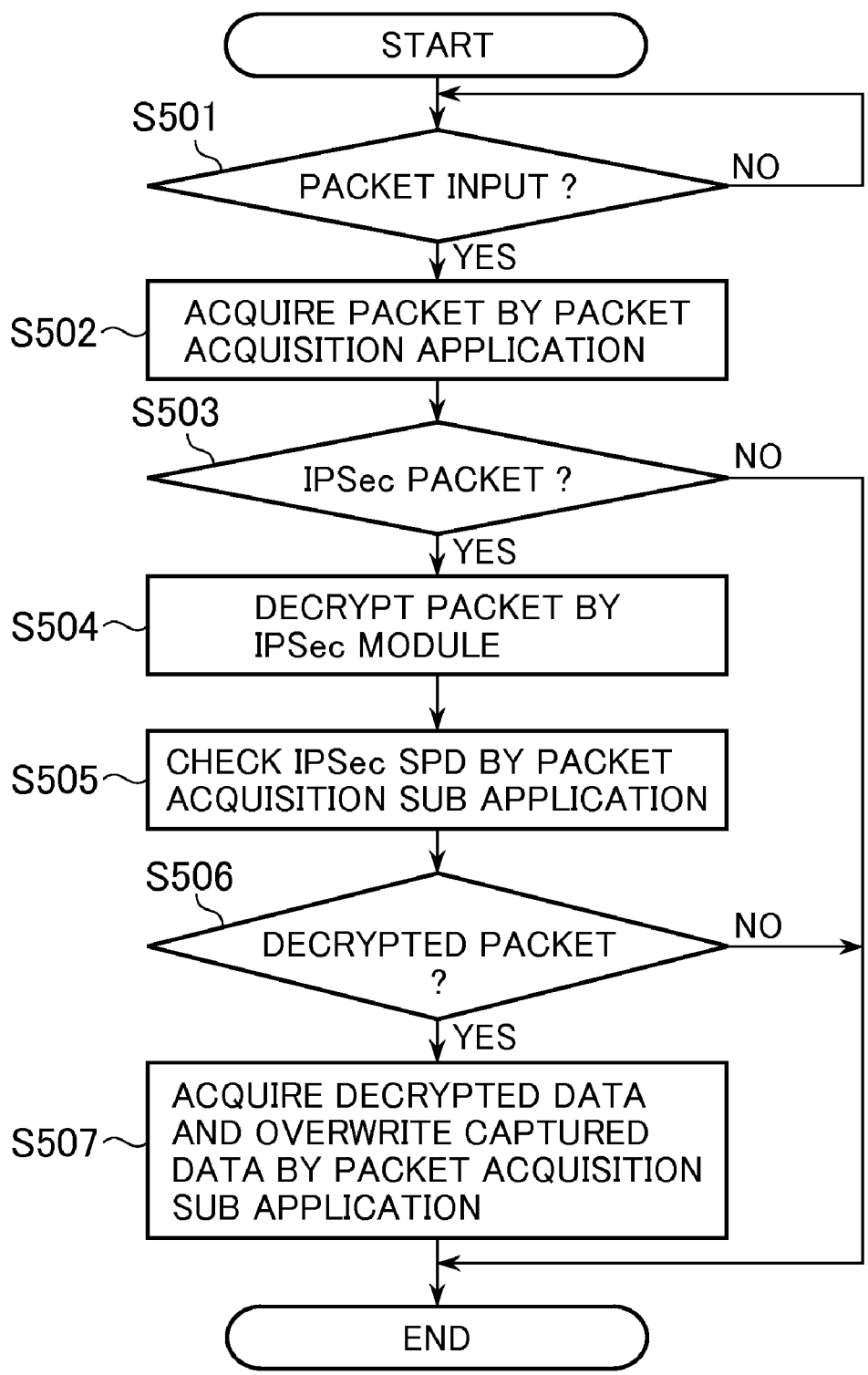
FIG. 5 is a flowchart of a packet acquisition process executed by the MFP when packets are received thereby.

FIG. 5 is a flowchart of a packet acquisition process executed by the MFP 101 when packets are received thereby. It should be noted in this flowchart, steps for passing and receiving packet data between applications are omitted.

FIG. 5 shows internal processing executed by the MFP 101 when one packet as a constituent portion of a print job to which IPSec is applied is transmitted by the PC 102 to the MFP 101 and is received by the MFP 101. It is assumed that before execution of the internal processing in FIG. 5, preliminary processing (e.g. mutual exchange of keys using IKE (Internet Key Exchange)) is already performed between the MFP 101 and the PC 102 for performing IPSec communication.

The MFP 101 is in a wait state awaiting reception of packets via the network. The packet acquisition application 305 of the MFP 101 monitors whether a packet is received (step S501). If reception of a packet is recognized by the network I/F 2010, the process proceeds to a step S502. The packet acquisition application 305 acquires the received packet data from the network I/F 2010, and stores the same as an item of the packet data 309 (step S502).

Figure 6:
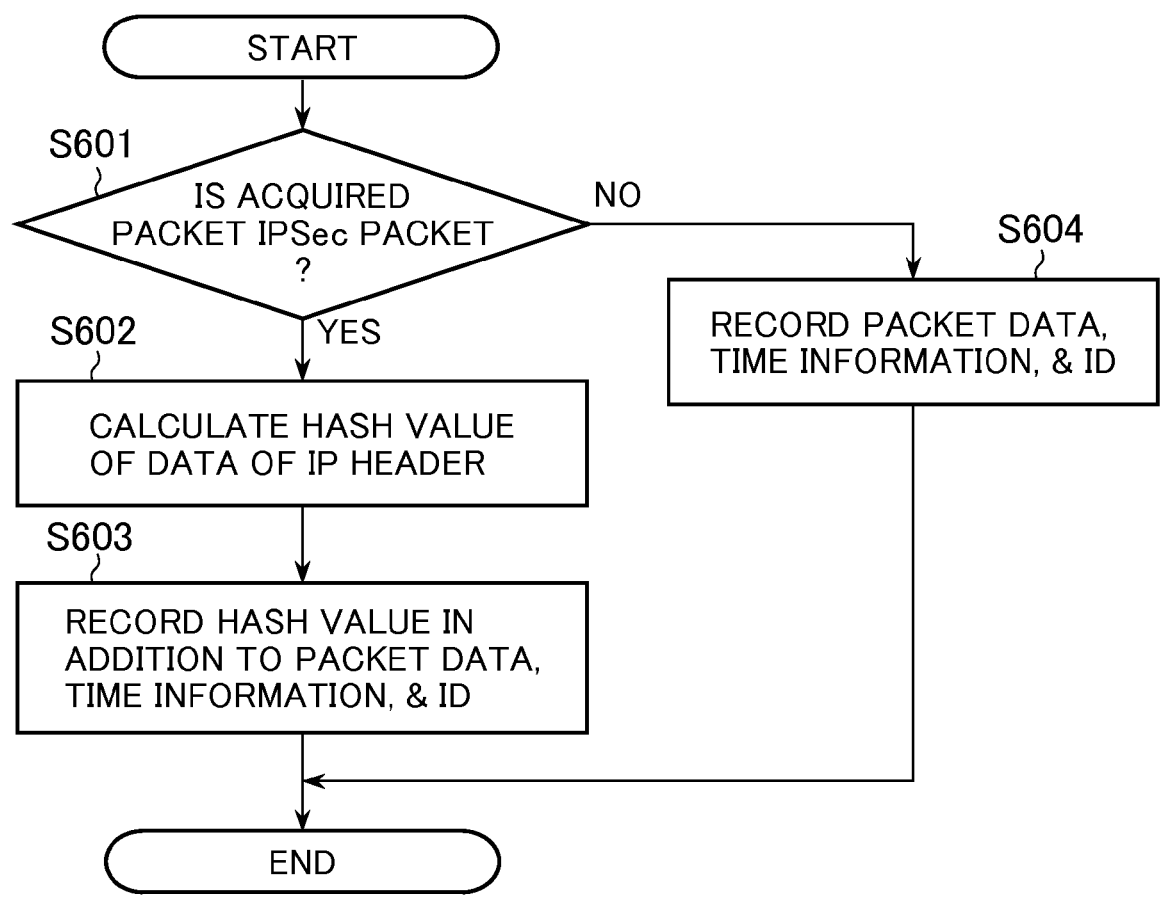
FIG. 6 is a flowchart of a packet data-storing process executed by a packet acquisition application of the MFP.

A detailed description will be given of a packet data-storing process executed by the packet acquisition application 305 in the above-mentioned step S502 with reference to FIG. 6. The packet acquisition application 305 determines whether or not the received (acquired) packet is an IPSec packet (step S601). The packet acquisition application 305 performs the above-mentioned determination by referring to next header information (Ethernet type (Ethertype) in the present embodiment) included in a header of the data link layer and an IP header, which is not encrypted, of the received packet data.

More specifically, if the next header information contained in the data link layer indicates IP, the packet acquisition application 305 refers to next header information included in the IP header (IP header of IPv4 or IPv6) which is not encrypted of the packet. Then, if the next header information indicates an ID which represents IPSec, the packet acquisition application 305 determines that the received packet is an IPSec packet, and the process proceeds to a step S602.

If it is determined in the step S601 that the received packet is an IPSec packet, the packet acquisition application 305 calculates a hash value of the data of the IP header of the received packet data (step S602). The reason for calculating a hash value here is to identify, in a step S507 in FIG. 5, referred to hereinafter, a packet data item to be overwritten out of a plurality of stored items of the packet data 309 when storing decrypted data of the IPSec packet in a manner overwriting the corresponding item.

In the step S507 in FIG. 5, referred to hereinafter, by also calculating the hash value of the data of the IP header in the same manner, it is possible to determine, out of the stored items of the packet data 309, that a packet data item having a hash value equal to that of the calculated hash value is an undecrypted packet data item of the packet to be stored. The hash value is used here because it is necessary to compress data since the method of directly comparing IP header data items requires larger amounts of data for comparison, resulting increased processing load.

Next, the packet acquisition application 305 adds packet reception time information, an ID, and the hash value to packet data item, and stores the resulting data item as an item (file) of the packet data 309 in the predetermined area of the HDD 204 (step S603). The packet acquisition application 305 enters packet data in each file.

FIG. 7 is a visualized example of contents of IPSec packet data recorded as an item of the packet data 309 by the packet acquisition application 305. A data portion 701 is hash information. In the present embodiment, the hash information is data having a size of 17 bytes, and the most significant bit thereof is information for representing presence or absence of hash.

If the most significant bit of the hash information is 1, it indicates that a valid value is contained in the hash value area from the second most significant bit to the least significant bit. If the most significant bit of the hash information is 0, it is indicated that no valid value is contained in the hash value area, but the hash value area is filled with zeros. A valid value is included in the hash value area only when the received packet is an IPSec packet, and the determination as to whether it is an IPSec packet is performed in the above-mentioned step S601.

A data portion 702 indicates time information. A time at which the MFP 101 received the packet is recorded in the form of the illustrated example (2007062809211480001, which means year: 2007; date: June 28; time: 09:21 (hour: minute), 48 (second)). A data portion 703 corresponding to a data link header, a data portion 704 corresponding to an IP header, and a data portion 705 corresponding to encrypted data constitute the received packet data itself. The packet acquisition application 305 writes all data of the received packet in an item (file) of the packet data 309. Therefore, the data written in the item of the packet data 309 is comprised of the received data including the data portion 703 which is specific to the data link layer, the data portion 704 which is specific to the IP layer, and the encrypted data portion 705, the data portion 701 indicating the hash information, and the data portion 702 indicating the packet reception time. In the present embodiment, it is assumed that the encrypted data portion 705 is encapsulated by ESP (Encapsulating Security Payload).

Although FIG. 7 shows a packet in a translated form so as to visualize the data structure, in actual writing of data in the item (file) of the packet data 309, the packet acquisition application 305 writes data ranging from the data portion 701 to the encrypted data portion 705 in the form of binary data.

If it is determined in the step S601 that the received packet is a packet other than an IPSec packet, the packet acquisition application 305 records the packet data, and the reception time and ID of the packet in one item (file) of the packet data 309 (step S604). In this case, the value of the most significant bit of the hash information is set to 0.

Referring again to FIG. 5, the process proceeds to a step S503, wherein it is determined using the IPSec module 306 whether the received packet is an IPSec packet. In the step S503, the data of the packet received in the step S501 is transferred to the network stack 303. The data to be transferred to the network stack 303 is data in the layer located at and after the IP layer-specific data portion (data portion 704 in FIG. 7) in the packet data. That is, data specific to the data link layer (data portion 703 in FIG. 7) is not transferred to the network stack 303.

The network stack 303 passes the received packet data to the IPSec module 306. The IPSec module 306 refers to the packet data, and determines based on the next header information included in the packet data whether or not the received packet is an IPSec packet (step S503). If it is determined in the step S503 that the received packet is an IPSec packet, the IPSec module 306 performs decryption of the encrypted data portion (encrypted portion) included in the packet (step S504). Then, the IPSec module 306 returns the decrypted packet data to the network stack 303, and the process proceeds to a step S505. If it is determined in the step S503 that the received packet is not an IPSec packet, the IPSec module 306 returns the packet data to the network stack 303 without executing any further processing, and the packet data is passed to the socket I/F 302 at a higher software processing level, followed by terminating the present process.

Next, the network stack 303 returns the decrypted packet data returned from the IPSec module 306 to the packet acquisition sub application 308, and in order to confirm whether the packet data returned from the network stack 303 is decrypted data of an IPSec packet, first, the packet acquisition sub application 308 checks the settings of IPSec security polices stored in the SPD 307 (step S505).

FIG. 8 shows the contents of the SPD by way of example. The SPD is a database that stores settings of policies as to what IPSec security is to be applied to what type of packets. In the illustrated example, three types of policies are set. Elements 801 to 806 are set to each of the policies, and IPSec is applied to packets matching any one set of respective settings of the elements 801 to 806.

The element 801 is a source IP address (From IP). The element 802 is a destination IP address (To IP). In each of the elements 801 and 802, an IP address or an IPv6 address is entered. The element 803 is a source port (From port). The element 804 is a destination port (To port). The element 805 is a protocol. The element 806 is an encryption method, i.e. information indicating what type of encryption is applied to the packets matching in the elements 801 to 805.

Returning to FIG. 5, by performing comparison between the settings of the IPSec security polices stored in the SPD 307 and checked in the step S505, and the contents of the packet data, the packet acquisition sub application 308 determines whether or not the packet data returned from the network stack 303 is decrypted data of an IPSec packet (step S506). That is, the packet acquisition sub application 308 investigates whether or not the contents of the received packet data match any one set of settings of the security policies registered in the SPD 307 (step S506). If it is determined that the contents of the received packet match any one set of settings of the security policies, the packet acquisition sub application 308 carries out a process for overwriting a corresponding portion of a corresponding item (file) of the packet data 309 with the decrypted packet data (step S507), and then returns the packet data to the network stack 303, whereafter the packet data is passed to the socket I/F 302 at the higher software processing level, followed by terminating the present process. If it is determined in the step S506 that the contents of the received packet does not match any set of settings of the security policies, the packet acquisition sub application 308 returns the packet data to the network stack 303 without performing any further processing, whereafter the packet data is passed to the socket I/F 302 at the higher software processing level, followed by terminating the present process.

A further detailed description will be given of the processing in the above-described step S507 with reference to FIG. 9. The packet acquisition sub application 308 carries out a process for calculating a hash value of the data of the IP header of the received packet data (step S901). The calculation of the hash value is performed by the same method as employed in the step S602 in FIG. 6.

Next, the packet acquisition sub application 308 compares the hash value of each packet data stored as a file of the packet data 309 with the hash value calculated in the step S901 by a packet sniffer. The packet acquisition sub application 308 searches for packet data having the same hash value as obtained in the step S901, based on the comparison (step S902).

If a packet data item (file) having the hash value is retrieved from the packet data 309, the packet acquisition sub application 308 carries out the following processing: The packet acquisition sub application 308 carries out processing for writing the data portions associated with the layers higher than the IP layer of the received packet data over corresponding data portions associated with the layers higher than the IP layer of the corresponding item (file) stored as the packet data 309 (step S903). It should be noted that reception time information of the packet is not overwritten.

FIG. 10 is an example showing an image of an item of the packet data 309 after being overwritten with corresponding decrypted data by the packet acquisition sub application 308. A data portion 1001 is TCP data. Although the data portion 705 in FIG. 7 (corresponding to the data portion 1001 in FIG. 10) of the packet data stored as an item (one file) of the packet data 309 by the packet acquisition application 305 is in a state encrypted by IPSec, the data portion 1001 of the item updated by the packet acquisition sub application 308 is in a state decrypted by the IPSec module.

As described above, according to the present embodiment, it is possible to store all data of packets which are encrypted by IPSec in a decrypted state, and hence this makes it possible to enhance efficiency of data analysis.

It should be noted that in the present embodiment, a packet data item to be overwritten is identified by calculating a hash value of data of each IP header, and comparisons between packet data items are made using thus calculated hash values. However, the method of identifying an packet data item is not limited to this, but it is possible to envisage various methods.

For example, instead of calculating a hash values of data of each IP header, the data itself of the IP header may be used for comparison. In this case, although the amount of data for comparison increases, it is possible to reduce load on processing for calculation of hash values.

Alternatively, information on time when each packet data item is received may be used for comparison. Further, even in the case of calculating hash values, not a hash value of only data of each IP header, but a hash value of data from each Ethernet (registered trademark) header to each IP header may be calculated. In this case, although a load on processing increases, the amount of data of which a hash value is calculated is increased, which makes it possible to improve reliability of comparison results. In this case, however, after processing on the Ethernet (registered trademark) header is carries out, the device driver 304 is required to store the resultant data, and the packet acquisition sub application 308 needs to acquire data of the Ethernet (registered trademark) header again.

A second embodiment of the present invention is distinguished from the first embodiment in points described hereinafter. Other elements (including hardware component elements) of the present embodiment are identical to corresponding ones of the first embodiment, and hence are denoted by the same reference numerals, while omitting the description thereof.

In the present embodiment, a description will be given of a case where a packet acquisition sub application is configured as a sub set module of the IPSec module as a different method of implementing the first embodiment.

In the first embodiment, the description has been given of the configuration in which the IPSec module 306 operates in the kernel space of the OS as an independent module, and the packet acquisition sub application 308 also operates in the application space as an independent module. Generally, the IPSec module operates as part of the OS. Further, the packet acquisition sub application operates in the application space as the user application. Therefore, the configuration in which IPSec module and the packet acquisition sub application are independent of each other is generally employed, as shown in the first embodiment.

However, in the case of devices integrated into a predetermined system, the IPSec module, the packet acquisition application, and the like are sometimes self-developed. In such a case, the configuration in which IPSec module and the packet acquisition application operate as an integral module, as shown in the present embodiment, is sometimes advantageous in the respect of processing performance and program size.

Figure 11:
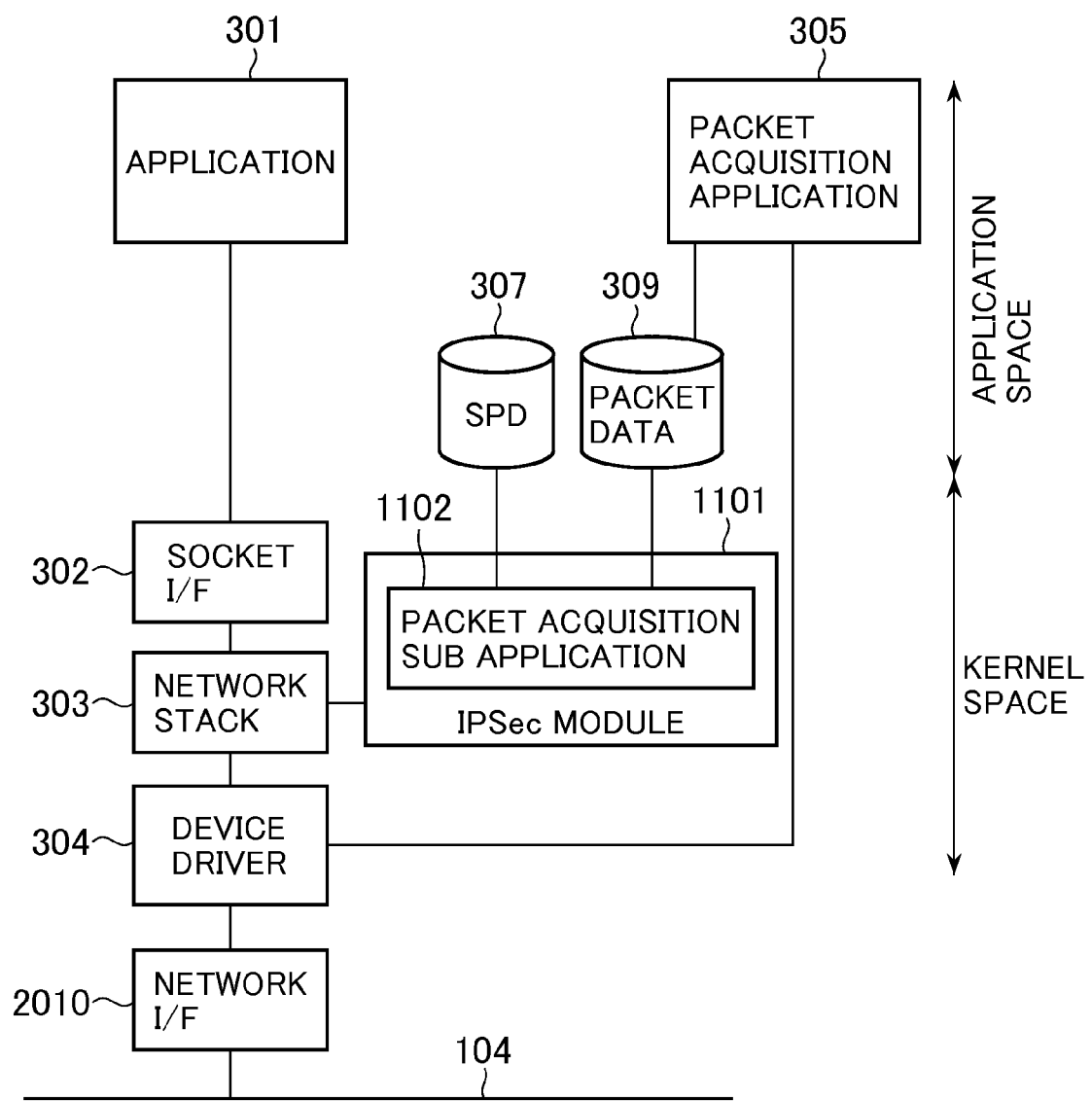
FIG. 11 is a block diagram of a network packet processing system of the MFP as an information processing apparatus according to a second embodiment of the present invention.

FIG. 11 is a block diagram of a network packet processing system of the MFP 101.

As shown in FIG. 11, the MFP 101 is equipped with a general-purpose OS such as Linux or the like. That is, the MFP 101 is comprised of the application 301, the socket I/F 302, the network stack 303, the network device driver 304, and the packet acquisition application 305. The MFP 101 is further comprised of the SPD 307, the packet data 309, and an IPSec module 1101 having a packet acquisition sub application 1102.

The application 301 is a collection of network applications which operate on the MFP 101. The point which differs from the first embodiment is a relationship between IPSec module 1101 and the packet acquisition sub application 1102. The packet acquisition sub application 1102 operates as part of the IPSec module 1101, and operates in the kernel space.

Although there is not much essential difference between the packet acquisition process executed upon reception of each packet according to the present embodiment and the process carried out in the first embodiment, shown in FIG. 5, differences exist in the details. Although in the first embodiment, the steps S505 to step S507 in FIG. 5 are executed by the packet acquisition sub application 308, the packet acquisition sub application 1102 operates as an internal module of IPSec module 1101 in the present embodiment. This makes it unnecessary to carry out the process for returning the packet data after decryption by IPSec module in the step S504 to the network stack 303, to thereby making it possible to improve processing speed.

A third embodiment of the present invention is distinguished from the first embodiment in points described hereinafter. Other elements (including hardware component elements) of the present embodiment are identical to corresponding ones of the first embodiment, and hence are denoted by the same reference numerals, while omitting the description thereof.

The description of the present embodiment corresponds to a case where using the configuration of the first embodiment, packets are transmitted from the MFP 101 to the PC 102 via the network.

When the MFP 101 transmits packet data to the PC 102, the application 301 transmits the packet data via the socket I/F 302. The socket I/F 302 passes the packet data for transmission to the network stack 303. Since the packet acquisition sub application 308 is hooked to the network stack 303, the packet data for transmission passed to the network stack 303 can be acquired by the packet acquisition sub application 308.

Figure 12:
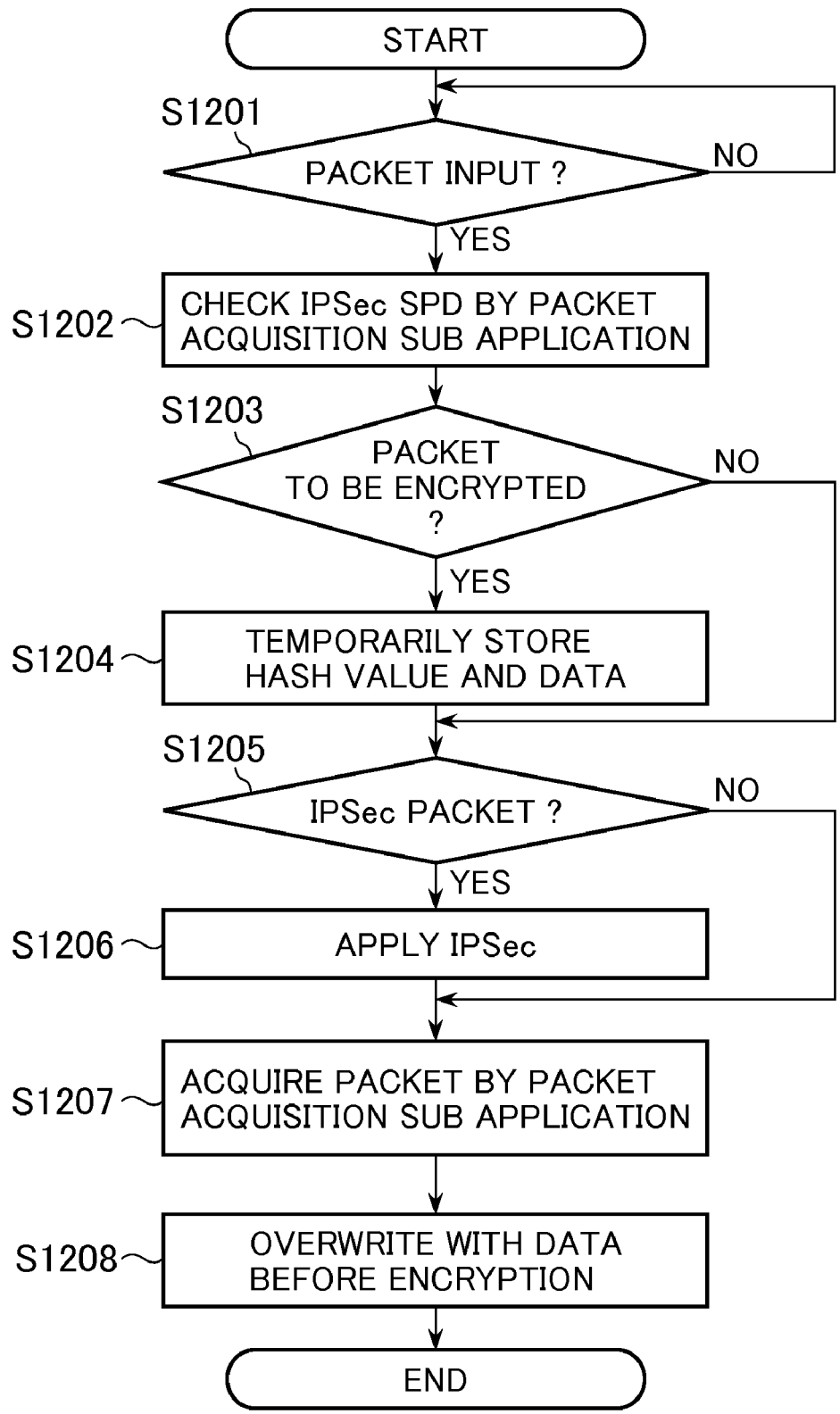
FIG. 12 is a flowchart of a packet acquisition process executed by the MFP appearing in FIG. 11 when packets are transmitted thereby.

FIG. 12 is a flowchart of a packet acquisition process executed when a packet is transmitted by the MFP 101.

As shown in FIG. 12, the packet acquisition sub application 308 monitors whether or not packet data for transmission is passed from the socket I/F 302 to the network stack 303 (step S1201). If the packet data for transmission is passed from the socket I/F 302 to the network stack 303, the packet acquisition sub application 308 acquires the packet data for transmission from the network stack 303.

Next, the packet acquisition sub application 308 checks the settings of IPSec security policies stored in the SPD 307 (step S1202). Further, the packet acquisition sub application 308 determines whether or not the packet data for transmission is an IPSec packet (packet to be encrypted) by comparing the settings of IPSec security polices and the contents of the packet data for transmission (step S1203). Since the packet data for transmission acquired from the network stack 303 by the packet acquisition sub application 308 has a data format in which headers and the like up to the IP layer-specific data are added, it is possible to compare the contents of the packet data with the settings of IPSec security policies stored in the SPD 307.

If it is determined in the step S1203 that the packet data for transmission is an IPSec packet, the process proceeds to a step S1204. The packet acquisition sub application 308 temporarily stores a hash value of the IP layer-specific data of the packet data for transmission and the packet data for transmission, and then the process proceeds to a step S1205 (step S1204). That is, the packet acquisition sub application 308 calculates a hash value from the IP layer-specific data of the packet data for transmission, the stores the calculated hash value and the packet data for transmission in the temporary storage area. If it is determined in the step S1203 that the packet data for transmission is not an IPSec packet, the process directly proceeds to the step S1205.

The temporary storage area is the storage area of the RAM 2002 or the storage area of the HDD 2004. If the acquired packet data is the packet data for transmission, the packet data is stored in the temporary storage area. The packet acquisition sub application 308 carries out the processing in the step S1204 only when the source IP address of the acquired packet data is an IP address of its own apparatus (MFP 101).

Next, a process for determining IPSec packet by the IPSec module 306 is carried out. That is, the IPSec module 306 refers to packet data which the network stack 303 received from the packet acquisition sub application 308 and passed to the IPSec module 306, and determines whether or not the packet is an IPSec packet based on next header information included in the IP header of the packet data (step S1205). If it is determined that the packet is an IPSec packet, the IPSec module 306 performs encryption of data associated with the higher layers than the IP layer included in the packet (applies IPSec) (step S1206). Then, the IPSec module 306 returns the encrypted packet data to the network stack 303.

If it is determined in the step S1205 that the packet is not an IPSec packet, the IPSec module 306 returns the packet data to the network stack 303 without performing further processing. The network stack 303 passes the packet data to be transmitted to the PC 102, to the network device driver 304. The network device driver 304 adds data specific to the data link layer to the received packet data for transmission.

Next, the packet acquisition application 305 acquires the packet data for transmission from the network device driver 304 (step S1207). Further, the packet acquisition application 305 calculates a hash value of the IP layer-specific data of the acquired transmitted packet data, and writes data as an item (file) of the packet data 309. The written data is comprised of packet transmission time information, the hash value, and a body of the packet data.

Next, the packet acquisition sub application 308 writes the packet data for transmission temporarily stored in the temporary storage area in the step S1204 together with the hash value over a corresponding portion of one item (file) of the packet data 309 including the same hash value (step S1208). According to this process, the data before being subjected to encryption is written over IPSec-applied data which has been encrypted in the step S1206 and has been written as one item (file) of the packet data 309 in the step S1207. This makes it possible to record unencrypted data in the packet data 309.

In the above-described embodiments, the network system shown in FIG. 1 is illustrated by way of example, but the number and types of apparatuses (MFP, PC, and mail server) which constitute the network system are not limited to the illustrated example.

Further, although in the above-described embodiments, the MFP is described as the information processing apparatus according to the present invention, by way of example, this is not limitative. The information processing apparatus according to the present invention may be a printer, a scanner, a facsimile machine, a copy machine, a PC, or a cellular phone.

It is to be understood that the present invention may also be realized by supplying a system or an apparatus with a storage medium in which a program code of software, which realizes the functions of the above described embodiments is stored, and causing a computer (or CPU or MPU) of the system or apparatus to read out and execute the program code stored in the storage medium.

In this case, the program code itself read from the storage medium realizes the functions of the above-described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2008-128314 filed May 15, 2008, which is hereby incorporated by reference herein in its entirety.

What is claimed is:

1. An information processing apparatus comprising:
    a reception unit configured to receive encrypted data, which has an encrypted portion and a non-encrypted portion, from a network;
    a storage unit configured to store the encrypted data received by said reception unit;
    a decryption unit configured to decrypt data, which is the encrypted portion of the encrypted data;
    a search unit configured to search said storage unit for the encrypted data corresponding to the data decrypted by said decryption unit, based on (a) the non-encrypted portion of the encrypted data stored in said storage unit, and (b) the non-encrypted portion of the encrypted data, wherein the encrypted portion of the encrypted data has been decrypted by said decryption unit; and
    an update unit configured to update the encrypted portion of the encrypted data, which has been stored in said storage unit and found by said search unit, based on the data decrypted by said decryption unit.

2. The information processing apparatus according to claim 1, further comprising:
    a unit configured to calculate a hash value from the non-encrypted portion of the encrypted data received by said reception unit, wherein the hash value is stored in the storage unit;
    a unit configured to calculate a hash value from the non-encrypted portion of the encrypted data after the encrypted portion has been decrypted by said decryption unit,
    wherein said search unit searches for the encrypted data by comparing the calculated hash values.

3. The information processing apparatus as claimed in claim 2,
    wherein the encrypted data has the encrypted portion, which is associated with higher layers than a network layer, and the non-encrypted portion, which is associated with the network layer and lower layers than the network layer, and
    wherein the hash values are calculated from the non-encrypted portion associated with the network layer and lower layers than the network layer.

4. The information processing apparatus as claimed in claim 1,
    wherein the network is a network which is compliant with TCP/IP, and
    wherein the encrypted data is data which is encrypted by IPSec.

5. The information processing apparatus according to claim 1, wherein
    said update unit does not update the non-encrypted portion of the encrypted data, which has been stored in the storage unit.

6. The information processing apparatus according to claim 1, wherein
    said storage unit stores the encrypted data which is acquired from a first layer, and
    said decryption unit decrypts the encrypted portion of the encrypted data which is acquired from a second layer which is higher than the first layer.

7. The information processing apparatus according to claim 1, wherein said storage unit stores the encrypted data and time information indicating a time at which the said reception unit receives the encrypted data.

8. The information processing apparatus according to claim 1, wherein said search unit searches for the encrypted data by comparing the non-encrypted portion of the encrypted data stored in said storage unit and the non-encrypted portion of the encrypted data as it exists at the time after the encrypted portion has been decrypted by said decryption unit.

9. A method of controlling an information processing apparatus, comprising the steps of:
    receiving encrypted data, which has an encrypted portion and a non-encrypted portion, from a network;
    storing the encrypted data received by said receiving in a storage unit;
    decrypting data, which is the encrypted portion of the encrypted data;
    searching the storage unit for the encrypted data corresponding to the data decrypted by said decrypting, based on (a) the non-encrypted portion of the encrypted data stored in the storage unit, and (b) the non-encrypted portion of the encrypted data, wherein the encrypted portion of the encrypted data has been decrypted by said decrypting; and
    updating the encrypted portion of the encrypted data, which has been stored in the storage unit and found by said searching, based on the data decrypted by said decrypting.

10. The method according to claim 9, further comprising the steps of:
    calculating a hash value from the non-encrypted portion of the received encrypted data, wherein the hash value is stored in the storage unit;
    calculating a hash value from the non-encrypted portion of the encrypted data as it exists at the time after the encrypted portion has been decrypted by said decrypting,
    wherein the encrypted data is searched by comparing the calculated hash values.

11. The method according to claim 10,
    wherein the encrypted data has the encrypted portion, which is associated with higher layers than a network layer, and the non-encrypted portion, which is associated with the network layer and lower layers than the network layer, and
    wherein the hash values are calculated from the non-encrypted portion associated with the network layer and lower layers than the network layer.

12. The method according to claim 9, wherein
    the encrypted data which is acquired from a first layer is stored in the storage unit,
    the non-encrypted portion of the encrypted data which is acquired from a second layer is decrypted, and
    the second layer is higher than the first layer.

13. The method according to claim 9, wherein the encrypted data is searched by comparing the non-encrypted portion of the encrypted data which is stored in the storage unit and the non-encrypted portion of the encrypted data as it exists at the time after the encrypted portion has been decrypted by said decrypting.

14. A non-transitory computer-readable storage medium storing a computer-executable program for causing a computer to execute a method,
wherein the method comprises the steps of:
receiving encrypted data, which has an encrypted portion and non-encrypted portion, from a network;
storing the encrypted data received by said receiving in a storage unit;
decrypting data, which is the encrypted portion of the encrypted data;
searching the storage unit for the encrypted data corresponding to the data decrypted by said decrypting, based on (a) the non-encrypted portion of the encrypted data stored in the storage unit, and (b) the non-encrypted portion of the encrypted data, wherein the encrypted portion of the encrypted data has been decrypted by said decrypting; and
updating the encrypted portion of the encrypted data, which has been stored in the storage unit and found by said searching, based on the data decrypted by said decrypting.

* * * * *